(12) United States Patent
Huth

(10) Patent No.: US 6,636,919 B1
(45) Date of Patent: Oct. 21, 2003

(54) METHOD FOR HOST PROTECTION DURING HOT SWAP IN A BRIDGED, PIPELINED NETWORK

(75) Inventor: Mark Huth, Glendale, AZ (US)

(73) Assignee: Motorola, Inc., Schaumburg, IL (US)

( * ) Notice: Subject to any disclaimer, the term of this patent is extended or adjusted under 35 U.S.C. 154(b) by 457 days.

(21) Appl. No.: 09/690,037

(22) Filed: Oct. 16, 2000

(51) Int. Cl.⁷ .............................................. G06F 13/00
(52) U.S. Cl. ...................... 710/304; 710/303; 710/305; 710/306; 710/308; 710/311; 710/107
(58) Field of Search ................................ 710/304, 308, 710/303, 107, 305, 306, 310, 312, 313, 314, 315, 100, 311; 714/100

(56) References Cited

U.S. PATENT DOCUMENTS

| | | | | |
|---|---|---|---|---|
| 5,594,886 A | * | 1/1997 | Smith et al. ................ | 711/136 |
| 5,598,539 A | * | 1/1997 | Gephardt et al. ........... | 710/304 |
| 5,793,987 A | * | 8/1998 | Quackenbush et al. ..... | 710/100 |
| 5,875,312 A | * | 2/1999 | Walsh et al. ................ | 710/303 |
| 5,898,888 A | | 4/1999 | Guthrie et al. ............. | 395/308 |
| 5,956,507 A | * | 9/1999 | Shearer et al. ............. | 709/104 |
| 6,003,106 A | * | 12/1999 | Fields et al. ................ | 710/308 |
| 6,105,146 A | | 8/2000 | Tavallaei et al. ............ | 714/2 |
| 6,108,778 A | | 8/2000 | LaBerge ...................... | 713/1 |
| 6,126,332 A | * | 10/2000 | Cubbage et al. ............ | 710/2 |
| 6,141,718 A | * | 10/2000 | Garnett et al. ............. | 710/308 |
| 6,145,029 A | * | 11/2000 | Deschepper et al. ........ | 710/36 |
| 6,161,157 A | * | 12/2000 | Tripathi et al. ............. | 710/109 |
| 6,163,824 A | * | 12/2000 | Quackenbush et al. ..... | 710/100 |
| 6,247,079 B1 | * | 6/2001 | Papa et al. .................. | 710/302 |
| 6,247,087 B1 | * | 6/2001 | Riley et al. ................. | 710/309 |
| 6,260,159 B1 | * | 7/2001 | Garnett et al. ............. | 714/15 |
| 6,434,653 B1 | * | 8/2002 | Winston ...................... | 710/303 |
| 6,457,091 B1 | * | 9/2002 | Lange et al. ................ | 710/314 |
| 6,460,106 B1 | * | 10/2002 | Stufflebeam ................ | 710/304 |
| 6,516,374 B1 | * | 2/2003 | Kinoshita et al. ........... | 710/304 |
| 6,519,669 B1 | * | 2/2003 | Yanagisawa ................. | 710/304 |

OTHER PUBLICATIONS

TechEncyclopedia, "DMA", 1998, TechWeb, http://www-.techweb.com/encyclopedia/defineterm?term=dma.*

* cited by examiner

Primary Examiner—Gopal C. Ray
Assistant Examiner—Justin King
(74) Attorney, Agent, or Firm—Kevin D. Wills

(57) ABSTRACT

In a bridged, pipelined network (FIG. 1), a network-to-host bridge (140) identifies the address space of a host computer (FIG. 2) as not being contained within the host computer memory space (120). During the removal of the host computer (100) and its replacement by a new host computer, the network-to-host bridge (140) momentarily locks out traffic (FIG. 3, step 320) in order to disable peripheral components (FIG. 1, 160, 180) from initiating bus transactions. When the new host computer is installed (FIG. 3, step 320) and the bus lockout is removed (step 340), the new host memory area is protected from direct memory access transactions which were stored in the bus hierarchy during the host computer swap.

18 Claims, 2 Drawing Sheets

METHOD FOR HOST PROTECTION DURING HOT SWAP IN A BRIDGED, PIPELINED NETWORK

FIELD OF THE INVENTION

The invention relates to computer systems and, more particularly, to a method for host protection during hot swap in a pipelined network.

BACKGROUND OF THE INVENTION

In a pipelined network, such as a Peripheral Component Interconnect (PCI) network, a bridge can be used in order to provide a means of conveying information across multiple constituent bus segments. The use of multiple bus segments enables the network to include more peripheral components than would be possible if only a single bus segment were to be used. Additionally, the use of a bridge in a pipelined network provides a means of increasing the aggregate bandwidth of the network by allowing transactions to initiate and terminate within a bus segment without involving the entire network.

In a high-availability system which incorporates a bridged multi-segmented network, transactions which are initiated at a peripheral component which is interfaced to a secondary bus segment can remain in the network since each bridge typically incorporates a capability to store a transaction as the transaction is bridged between bus segments. This capability allows the bridge to forward the transaction through the network hierarchy and place the transaction on a target bus as the intervening buses become available and able to accept the new transaction. Among these are transactions which allow the direct memory access of areas within the host computer memory space by particular peripheral components.

In a bridged, pipelined network operating in a high-availability environment, a hot swap of a host computer while a direct memory access transaction exists at a bridge located within the bus hierarchy can degrade the new host computer. This event can be made possible if the new host computer includes a memory allocation scheme which is not identical to the memory allocation scheme of the previous host computer. Therefore, during the moments immediately after the hot swap of the host computer, direct memory access transactions intended for the previous host computer can degrade and, in some cases, temporarily suspend (i.e. crash) operations on the network.

Therefore, what is needed, is a method for host protection during hot swap in a bridged, pipelined network. This type of method can be useful in 5 preserving the integrity of the new host computer after the removal and replacement of the previous host computer.

BRIEF DESCRIPTION OF THE DRAWINGS

The invention is pointed out with particularity in the appended claims.

However, a more complete understanding of the invention may be derived by reading the specification herein in conjunction with the figures wherein like reference numbers refer to like components, and.

DESCRIPTION OF THE PREFERRED EMBODIMENTS

A method for host computer protection during hot swap in a bridged, pipelined network preserves the integrity of the network as well as the host computer during critical hot swap operations. The method protects the host computer without requiring a reset of the various segments of the network after the hot swap of the host processor. Therefore, the method is particularly useful in high-availability applications where a reset of the network bus would be highly undesirable. Additionally, the method can be used to protect the memory of the host processor from direct memory access transactions intended for the previous host processor. The method does not require additional hardware, and can be executed without violating the constraints of the Peripheral Component Interconnect (PCI) specification.

Figure 1:
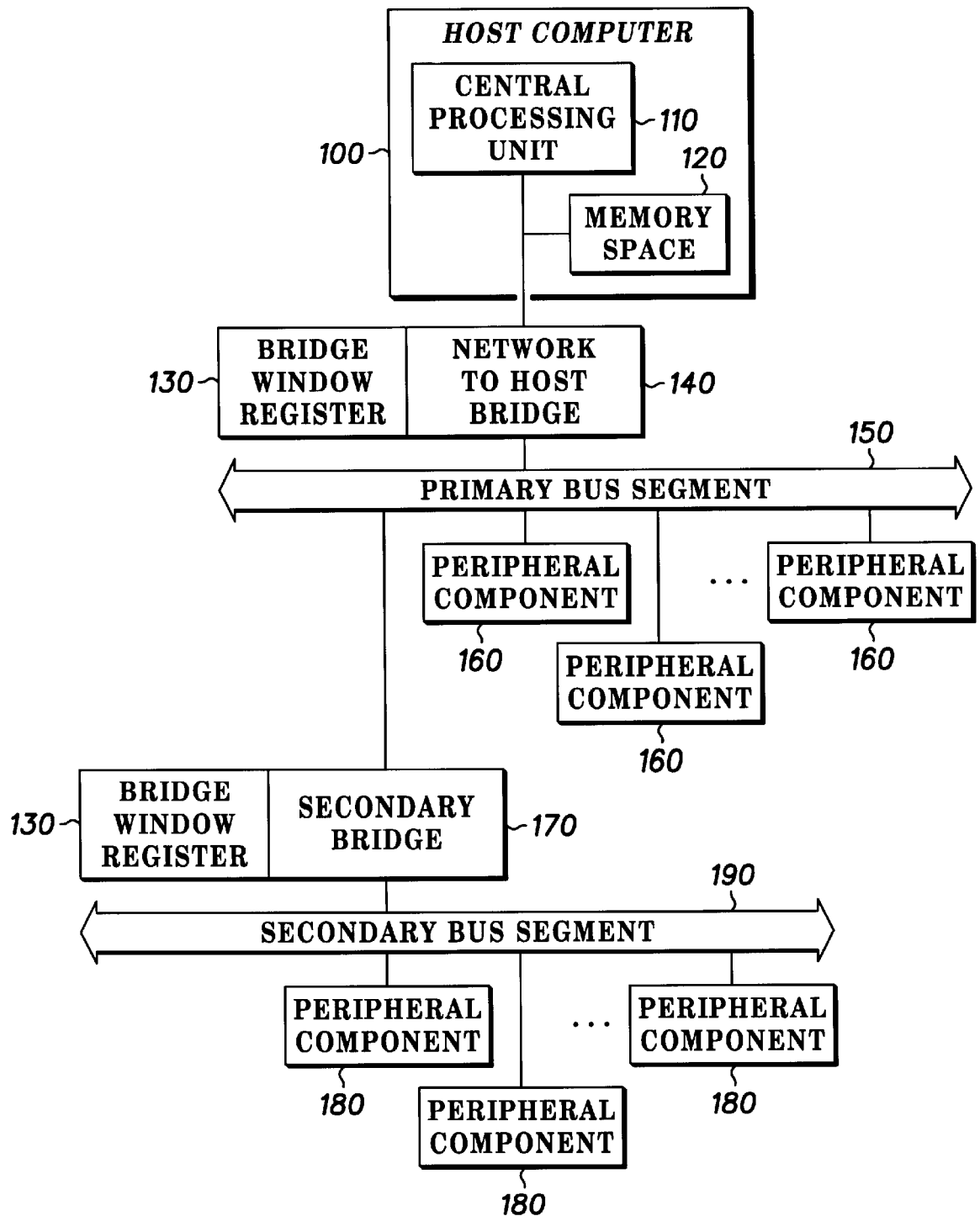
FIG. 1 is a block diagram for an architecture in which a method for host protection during hot swap in a bridged, pipelined network may be practiced in accordance with a preferred embodiment of the invention.

FIG. 1 is a block diagram for an architecture in which a method for host protection during hot swap in a bridged, pipelined network may be practiced in accordance with a preferred embodiment of the invention. In FIG. 1, host computer 100 interacts with peripheral components 160 and 180 which are interfaced to primary and secondary bus segments 150 and 190, respectively. Host computer 100 accesses bridge window register 130 in order to configure each bridge and assign address ranges for bus segments 150 and 190. Host computer 100 includes central processing unit 110 and memory space 120. Although the network of FIG. 1 illustrates a bus hierarchy which consists of only a primary and secondary bus segment, this is not intended to limit the scope of the invention in any way. The two-level bus hierarchy of FIG. 1 is intended to provide a simple and easily understandable environment in which the invention may be practiced. More complex bus hierarchies are possible without diminishing the utility of the various aspects of the present invention.

In FIG. 1, network-to-host bridge 140 provides host computer 100 with access to primary bus segment 150. In a similar manner, secondary bridge 170 provides access secondary bus segment 190. It is generally anticipated that each bridge is an intelligent repeater that incorporates a pipelined capability that allows messages and transactions to be conveyed in directions both toward and away from host computer 100. Each bridge allows arbitration within a particular segment and allows this arbitration to occur independently of the other bus segment.

In the context of the present example, it is contemplated that the pipelined network of FIG. 1 incorporates a store-and-forward capability. This allows messages to be stored at bridges 140 and 170, thereby allowing each bridge to hold a particular message or transaction until the succeeding bus segment becomes available to accept the transaction. This store-and-forward capability is especially useful in multi-level architectures where bus segments can become congested with local bus traffic.

In the bridged, pipelined network of FIG. 1, it is anticipated that an address space of a particular size is used by the network. Thus, when the pipelined network of FIG. 1 is designed in accordance with the PCI specification, a four-gigabyte address space is used. Additionally, it is anticipated that both network-to-host bridge 140 and secondary bridge 170 identify address ranges which cross each bridge in the upstream direction (meaning transactions which move toward host computer 100) and address ranges which cross each bridge in the downstream direction (meaning transactions which move away from host computer 100). Through the use of these address ranges, transactions can be properly directed from host computer 100 towards a particular peripheral component, and from a particular peripheral component toward host computer 100.

In accordance with the PCI specification, transactions from peripheral components, such as peripheral components 160 and 180, may include direct memory accesses of memory space 120 within host computer 100. Thus, a direct memory access transaction can initiate from peripheral component 180, through secondary bridge 170, across primary bus segment 150, and terminate at network-to-host bridge 140. Through the appropriate use of the aforementioned upstream and downstream address ranges, each transaction can be properly routed through the network of FIG. 1. In the event that network-to-host bridge 140 does not recognize the transaction as belonging to host computer 100, network-to-host bridge 140 does not claim the transaction. In the event that the transaction includes an address which corresponds to one of peripheral components 160, the appropriate one of peripheral components 160 claims the address and executes the transaction. In the event that neither network-to-host bridge 140 nor one of peripheral components 160 claims the transaction, a period of time is allowed to elapse, and the transaction is dropped. When this occurs, network-to-host bridge 140 can raise an error flag that indicates that the transaction has been dropped.

Although FIG. 1 has been described as including a network which conforms to conventional PCI bus standards, primary and secondary bus segments 150 and 190 can represent any hierarchical parallel bus structure that incorporates a bridged, pipelined architecture for expanding the number of peripherals which can be interfaced with each bus segment.

Figure 2:
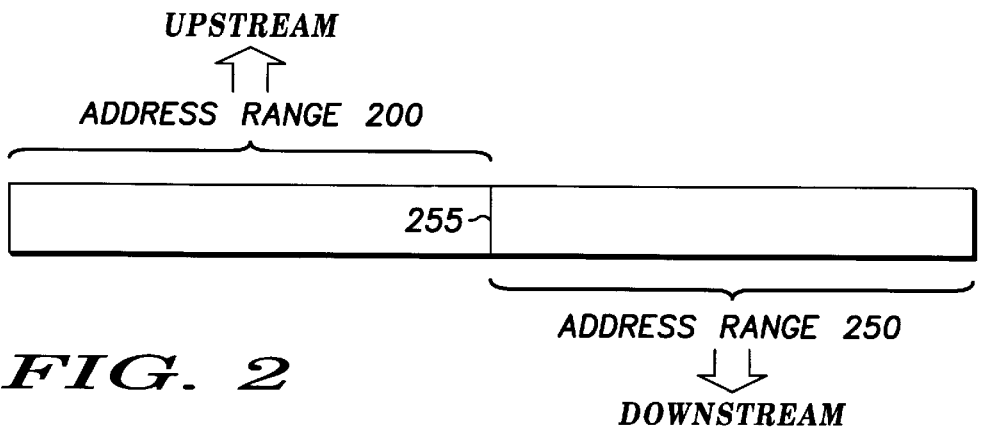
FIG. 2 is an illustration of an address space used by a candidate bridge in a pipelined network in accordance with a preferred embodiment of the invention.

FIG. 2 is an illustration of an address space used by a candidate bridge in a pipelined network in accordance with a preferred embodiment of the invention. Thus, for example, the address space of FIG. 2 can represent the global address space for the bridged, pipelined network of FIG. 1 when network-to-host bridge 140 and secondary bridge 170 represent bridges used in Peripheral Component Interconnect equipment. Additionally, address range 200 can represent those addresses which lie upstream of network-to-host bridge 140, meaning that these addresses exist within memory space 120, while address range 250 represents those addresses which lie downstream of network-to-host bridge 140, meaning that these addresses do not lie within memory space 120. For the example of FIG. 2, boundary 255 provides the boundary between address ranges 200 and 250.

In a preferred embodiment, the value of boundary 255 is accessible to host computer 100. Host computer 100 functions to allocate portions of the address ranges 200 and 250 by way of bridge window register 130. It is anticipated that when using current PCI-compliant networks, host computer 100 is capable of only extending boundary 255 in order to direct transactions in an upstream or downstream direction. However, in the event that additional registers can be incorporated into network-to-host bridge 140, a more flexible manipulation of the address space of FIG. 2 can be achieved. For example, address range 200 could be segmented in order to allow multiple regions within the range to correspond to upstream address ranges, while regions in-between can correspond to downstream address ranges.

In a preferred embodiment of the invention, boundary 255 is advantageously manipulated in order to protect memory space 120 when host computer 100 is swapped. When host computer 100 is swapped, the address range corresponding to locations within memory space 120 is modified. Desirably, bridge window register 130 modifies boundary 255 in a manner which causes address range 250 to increase in size, while address range 200 decreases in size. In some instances, it may be advantageous for bridge window register 130 to cause boundary 255 to move so that address range 250 encompasses all of the address space of FIG. 2, thereby eliminating address range 200 altogether.

By modifying boundary 255 in order to reduce the size of (or eliminate altogether) address range 200, the likelihood of a transaction affecting memory space 120 is reduced or eliminated entirely. Therefore, when the new host is inserted in place of host computer 100, network-to-host bridge 140 will not enable any transactions, such as direct memory accesses, to affect memory space 120 of the new host computer (which is not shown in FIG. 1). Therefore, any transaction which exists at either primary bus segment 150 or secondary bus segment 190 will not be forwarded to memory space 120. Desirably, transactions intended for memory space 120 are dropped when they remain unclaimed by any one of peripheral components 160 or 180, or the new host computer.

In the event that additional registers can be incorporated into network-to-host bridge 140, these registers can be used to specify special actions for a particular address range. Thus, transactions which correspond to a particular address range (or ranges) can be purged or more positively acted upon as opposed to merely allowing a transaction to drop. This technique prevents error flags from being raised in response to unclaimed transactions being dropped by bus segment 150 or 190. In addition to purging transactions, other special actions could include ignoring a transaction, claiming a transaction and returning a fixed data pattern, or aborting the transaction. Further, the special action registers could be configured to enable a transaction which is dependent upon the originator of the transaction. Thus, transactions originating from a particular peripheral which may be behaving erratically can be prevented from affecting a host computer.

Figure 3:
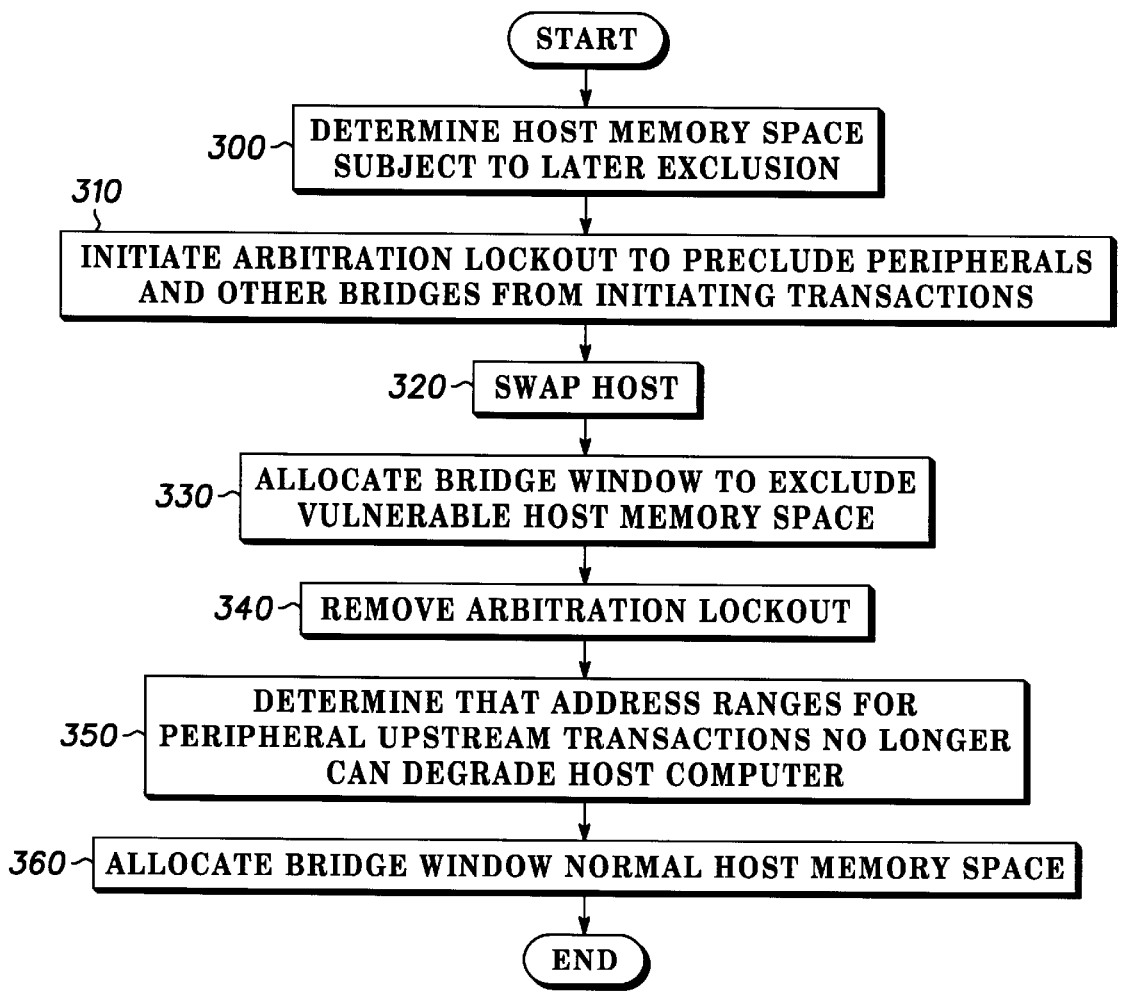
FIG. 3 is a method for host protection during hot swap in a bridged, pipelined network.

FIG. 3 is a flowchart of a method for host computer protection during hot swap in a bridged, pipelined network. The apparatus of FIG. 1 is suitable for performing the method of FIG. 3, although networks functionally similar or equivalent to FIG. 1 may be used. The method of FIG. 3 begins at step 300 where the host computer memory address space subject to later exclusion is determined. It is contemplated that this includes a substantial portion of the host computer's memory space.

At step 310, a network-to-host bridge initiates an arbitration lockout command in order to preclude peripherals and other bridges from initiating transactions. During step 310, it is anticipated that peripherals interfaced to primary and secondary bus segments of the network are precluded from initiating transactions, but can respond to transactions initiated by a network-to-host bridge. This arbitration lockout ensures that the bus segments remain in a predictable and definite state during step 320. At step 320, a host computer is removed, and a new host computer is inserted in its place. The precise actions that constitute step 320 may include either the physical or logical swapping of a host computer. It is anticipated that this host computer swap is the result of a host fault or software fault or for the purposes of upgrade or latent fault detection.

In step 330, the contents of a bridge window register is modified in order to allocate the bridge window such that vulnerable host memory space is excluded from the address range indicative of the previous host computer memory space. Preferably, this entails a bridge window register conveying a designation that the host computer memory space corresponds to a location outside of the actual memory space. One technique by which this can be accomplished is by way of extending a boundary of an address range which identifies memory locations downstream of the host computer memory space, as discussed in relation to FIG. 2.

At step 340, the new host computer removes the arbitration lockout thereby enabling the peripheral components interfaced to primary and secondary bus segments to initiate transactions. During this time, transactions that can affect the memory space, such as direct memory accesses, are forbidden from occurring. When these transactions are not forwarded across the network-to-host bridge, an error flag is raised on a primary bus segment. This error flag notifies the new host computer that transactions intended for the memory space of the previous host computer are being dropped by the primary bus segment.

In the event that special action registers are in use, step 340 need not lead to generation of error flags when while transactions intended for the previous host memory space are being received. The special action registers can be employed purge transactions from the bridge, claim and ignore the transaction, claim a transaction and return a fixed data pattern, and claim a transaction and perform a target abort. The special action register can also perform a particular action which is dependent on the originator of the transaction.

At step 350, the host computer determines that address ranges for upstream transactions can no longer degrade the host computer. Step 350 can be performed in response to the new host computer no longer receiving error flags which indicate that transactions are being discarded. Thus, after initial error flags have been received, the host computer may determine that such an error flag has not been received within a predetermined time period, thereby determining that transactions addressed to the previous host computer memory space are no longer occurring.

Step 350 can also include the new host computer conveying a new address range to peripheral components interfaced to a bus segment. These new address ranges correspond to the new host computer memory space wherein a transaction will not degrade the performance of the host computer. Step 350 may also include reading a status of a peripheral in order to determine that the peripheral component has received the new address range for the memory space of the new host computer.

At step 360, a bridge window modifies an address range in order to designate the address range of the host computer as corresponding to a location within the actual host computer memory space. This step allows transactions properly addressed to the memory space of the new host computer to pass in the upstream direction through the network-to-host bridge and into the memory space of the new host computer.

In conclusion, a method for host computer protection during hot swap in a bridged, pipelined network preserves the integrity of the network as well as the host computer during critical hot swap operations. The method protects the host computer without requiring a reset of the various segments of the network after the hot swap of the host processor. Therefore, the method is particularly useful in high-availability applications where a reset of the network bus would be highly undesirable. The method does not require additional hardware, although additional hardware such as special action registers can increase the flexibility of the method. Additionally, the method can be executed without violating the constraints of the Peripheral Component Interconnect (PCI) specification.

Accordingly, it is intended by the appended claims to cover all modifications of the invention that fall within the true spirit and scope of the invention.

What is claimed is:

1. In a pipelined network, a method for host computer memory space protection during a hot swap of said host computer, comprising:
   determining that transactions addressed to a location within said host computer memory space can degrade performance of said host computer;
   modifying contents of a bridge window register controlled by said host computer to designate an address range of said host computer memory space as corresponding to a location outside of said host computer memory space;
   determining that said transactions addressed to said host computer memory space should no longer occur; and
   modifying said address range of said bridge window register to designate a new address range of said host computer as corresponding to a location within said host computer memory space.

2. The method of claim 1, wherein said bridge window register operates in accordance with a Peripheral Component Interconnect specification.

3. The method of claim 2, wherein said location outside of host computer memory space corresponds to a location on a secondary bus segment and wherein said host computer is interfaced to a primary bus segment.

4. The method of claim 1, further comprising swapping said host computer with a second host computer after said first modifying action.

5. The method of claim 1, further comprising swapping said host computer with a second host computer prior to said first modifying action.

6. The method of claim 5, wherein said first modifying action further comprises said host computer precluding peripherals which operate on said pipelined network from initiating a transaction on said pipelined network during said swapping.

7. The method of claim 1, further comprising swapping said host computer with a second host computer after said first modifying action and wherein said first modifying action further comprises said second host computer precluding at least one peripheral component which operates on said pipelined network from initiating a transaction on said pipelined network during said swapping.

8. The method of claim 1, wherein said second determining action further comprises said host computer conveying a new address range to at least one component interfaced to a bus segment of said pipelined network, said new address range corresponding to host computer memory space wherein a th transaction will not degrade performance of said host computer.

9. The method of claim 1, further comprising swapping said host computer with a second host computer after said first modifying action and wherein said second determining action further comprises said second host computer conveying a new address range to at least one component interfaced to a bus segment of said pipelined network, said new address range corresponding to host computer memory space wherein ea the transaction will not degrade performance of said host computer.

10. The method of claim 1, wherein said s determining action further comprises said host computer reading a status of at least one peripheral, thereby showing that said at least one peripheral has received said new address range.

11. The method of claim 10, wherein said reading action indicates that said transactions addressed to said location within said host computer memory space should no longer occur.

12. The method of claim 1, further comprising swapping said host computer with a second host computer after said first modifying action and wherein said second determining action further comprises said second host computer reading a status of at least one peripheral component, thereby showing that said at least one peripheral component has received said new address range.

13. The method of claim 12, wherein said reading action indicates that said transactions addressed to said location within said host computer memory space should no longer occur.

14. The method of claim 1, wherein said address range is contiguous to a second address range which corresponds to a memory space located on a secondary bus segment.

15. The method of claim 1, wherein said second determining action includes said host computer receiving an error flag which indicates that a the transaction has not been claimed by a peripheral interfaced to a secondary bus segment.

16. The method claim 15, wherein said second determining action further includes said host computer determining that a second error flag has not been received within a predetermined time period, thereby determining that said transactions addressed to said location within said host computer memory space should no longer occur.

17. The method of claim 1, further comprising swapping said host computer with a second host computer after said first modifying action wherein said second determining action includes said second host computer receiving an error flag which indicates that the transaction has not been claimed by a peripheral interfaced to a secondary bus segment.

18. The method claim 17, wherein said second determining action further includes said host computer determining that a second error flag has not been received within a predetermined time period, thereby determining that said transactions addressed to said host computer memory space should no longer occur.

\* \* \* \* \*

UNITED STATES PATENT AND TRADEMARK OFFICE
CERTIFICATE OF CORRECTION

PATENT NO.    : 6,636,919 B1
DATED         : October 21, 2003
INVENTOR(S)   : Mark Huth It is certified that error appears in the above-identified patent and that said Letters Patent is hereby corrected as shown below:

Column 6,
Line 55, delete "a" and should be -- the --.
Line 64, delete "ea".
Line 66, delete "s" and insert -- second --.

Column 7,
Line 21, delete "a".

Signed and Sealed this

Twenty-seventh Day of July, 2004

JON W. DUDAS
*Acting Director of the United States Patent and Trademark Office*